United States Patent [19]

Parent

[11] Patent Number: 4,755,087

[45] Date of Patent: Jul. 5, 1988

[54] HOLE SAW PLUG EJECTOR

[76] Inventor: Philip V. Parent, Box 8700 Notch Rd., Mendon, Vt. 05701

[21] Appl. No.: 25,479

[22] Filed: Mar. 13, 1987

[51] Int. Cl.$^4$ .............................................. B23B 51/04
[52] U.S. Cl. ..................................... 408/68; 408/204; 408/703
[58] Field of Search ................. 408/68, 204, 206, 207, 408/209, 223-225, 703; 144/20, 21, 23

[56] References Cited

U.S. PATENT DOCUMENTS

| | | | |
|---|---|---|---|
| 2,349,400 | 5/1944 | Beckwith | 144/23 X |
| 2,435,648 | 2/1948 | Frevel | 408/68 |
| 4,669,928 | 6/1987 | Mediavilla | 408/68 |

Primary Examiner—Gil Weidenfeld
Assistant Examiner—Steven C. Bishop

[57] ABSTRACT

An improved hole saw mandrel for use in a power drill or the like comprising an ejector mechanism which allows the operator to eject the plug that remains bound within the confines of the hole saw after the hole has been cut. The ejector mechanism is provided with rods which extend into the confines of the hole saw.

In the power operated embodiments, the ejector mechanism contains a thread follower which is engagable with a thread on the mandrel shaft thereby advancing the ejector mechanism along the shaft. This advancement causes the rods to progress through the confines of the hole saw and forces out the entrapped plug. Retraction of the rods is accomplished by one of several methods. In the one, the drill rotation is reversed causing the follower to reverse its direction and withdraw the rods. In another method, the follower is disengageable allowing the ejector mechanism to be retracted manually. Still another method uses a dual direction thread with engageable followers. The appropriate follower is engaged to control the direction of movement of the ejector mechanism without changing the drill rotation direction. In the manual design, the rods are forced through the confines of the hole saw by means of a manually slidable block. The rods are retracted by sliding the block in the reverse direction. An adaptor is provided to allow for attaching, to the mandrel, a hole saw of which the attaching contours do not match the contours of the present invention.

8 Claims, 5 Drawing Sheets

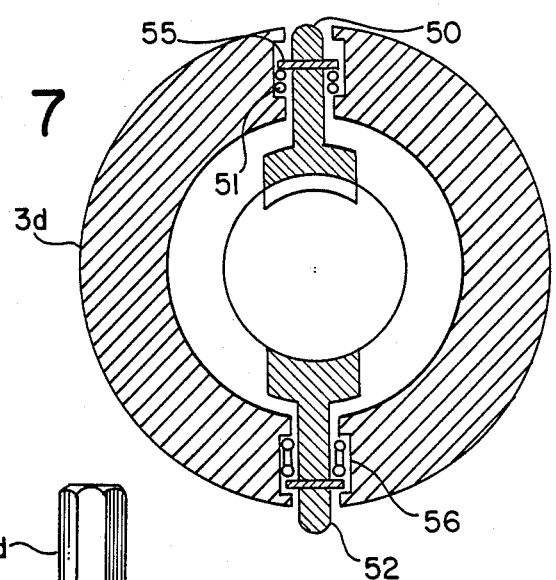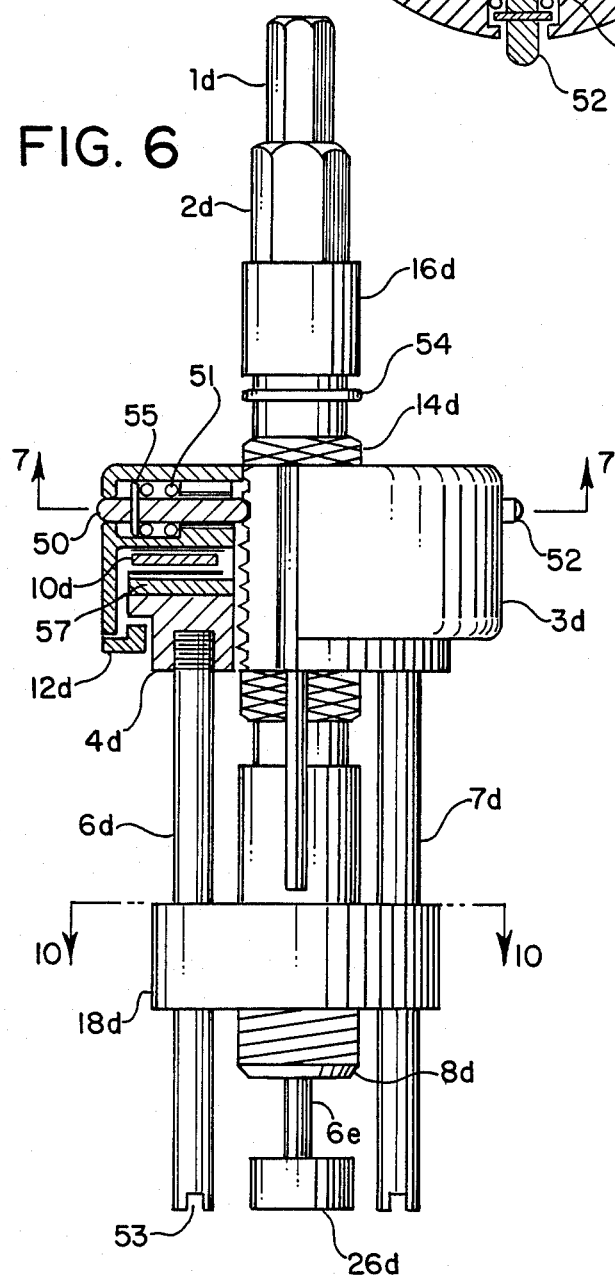

HOLE SAW PLUG EJECTOR

BACKGROUND OF THE INVENTION

Cylindrical type hole saws, as known, necessarily allow for the cut out hole plug to enter the cylinder as it is being cut and remain there when the hole saw is withdrawn from the workpiece. Generally, this plug becomes bound within the cylinder. In order to remove this plug, one of two methods is generally employed. With the one, a screwdriver blade or similar slim object is inserted into one of the several slots provided in the periphery of the saw blade. The screwdriver is then canted, thereby forcing the plug outward. The screwdriver is then retracted and reinserted into another slot and canted. This procedure is repeated until the plug is completely removed from the cylinder.

The second method utilizes holes provided through the mounting end of the cylinder. A thin cylindrical object such as a punch, is alternately inserted into these holes and pushed or hammered until the plug has been forced out of the cylinder. Both of these methods require that the drill motor be disconnected from its electrical outlet to prevent accidental starting of the drill motor which would cause an obvious safety hazard.

The present invention provides for the removal of the cutout plug without disconnecting the drill motor and makes the removal faster, safer, and easier than is presently known.

SUMMARY OF THE INVENTION

The present invention relates to a novel method of removing the cut out workpiece hole plug from the inner confines of a cylindrical type hole saw using the power of the drill motor to which it is connected or by manual force applied.

The invention accomodates standard cylindrical hole saws of varying sizes with saw teeth at one end of its cylindrical body and a transverse end wall at the opposite end and providing a means of attachment to a mandrel which is mounted in a drill chuck or the like.

In the presently preferred embodiment, the mandrel of the present invention has one or more sizes of shank for reception in a drill chuck or the like. An entry hole is provided at one end of, and within, the center of the mandrel to slidably accept a pilot drill which is secured in place by a set screw on the mandrel. Another hole is provided within the center of the mandrel extending from the pilot hole to the shank end of the mandrel to provide for removal of the pilot drill should it break off within the pilot drill hole.

In the manual versions, the manual force applied is directed to the workpiece hold plug in a manner that causes it to dislodge and eject from within the hole saw.

In the power operated embodiments, the mandrel of the present invention is provided with a thread of varying design which, in conjunction with a thread follower, converts a portion of the rotational force of the mandrel to a longitudinal force which is directed towards the workpiece hole plug, causing the hole plug to be forced from within the confines of the hole saw. The variety of methods of transferring this motion will become apparent from the following detailed descriptions of the presently preferred embodiments thereof which is shown in the accompanying drawings.

BRIEF DESCRIPTION OF THE DRAWINGS

FIG. 6 is a schematic view of another embodiment of the present invention, partially cross sectioned.

FIG. 7 is an enlarged cross sectional view taken generally along the lines 7—7 in FIG. 6 with the shaft removed.

FIG. 8 is a perspective view of an adaptor used in conjunction with the main embodiment of the present invention.

FIG. 9 is a perspective view of a hole saw as used in conjunction with the adaptor shown in FIG. 8.

FIG. 10 is a cross sectional view taken along the lines 10—10 in FIG. 6 with the adaptor from FIG. 8 and the hole saw from FIG. 9 added.

Before explaining the disclosed embodiment of the present invention in detail, it is to be intended that the invention is not limited in its application to the details of the particular arrangements shown, since the invention is capable of other embodiments. Also, the terminology used herein is for the purpose of description and not of limitation.

It will become obvious to a person skilled in the field that the embodiments taught herein, lend themselves to a variety of configurations and that minor changes of the configurations shown for the ease or economy of manufacture, would not depart from the spirit of the invention. It will also become obvious that the variety of configurations are interchangeable with one another and by so doing, does not depart from the spirit of the invention.

DETAILED DESCRIPTION

Figure 1:
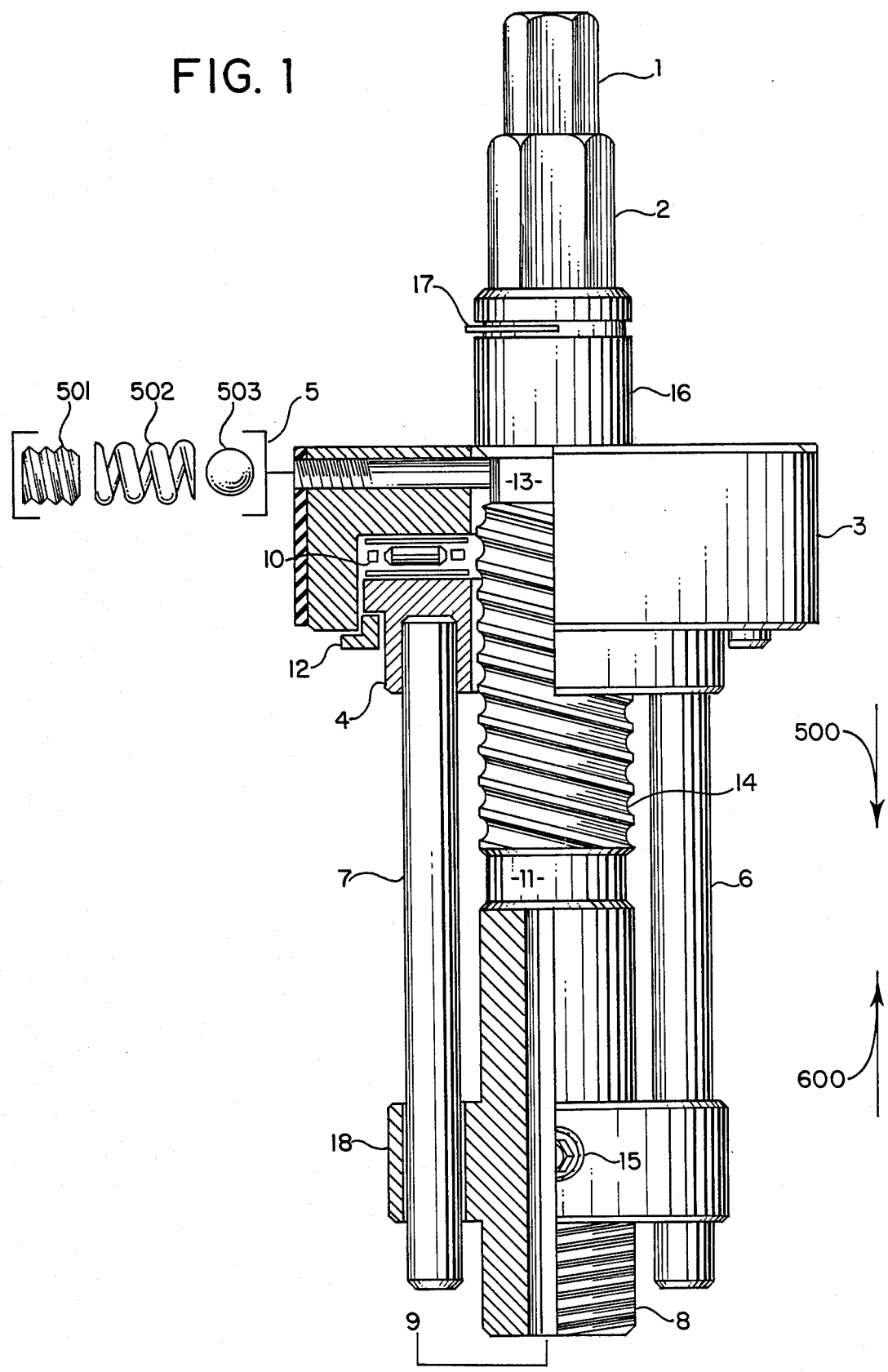
FIG. 1 is an enlarged schematic view of one embodiment of the present invention, with a partial quarter section removed for clarity.

Reference is made to FIG. 1 cross sectional view of the present invention as one method of carrying the invention into practice. The embodiment described in FIG. 1 comprises a hollow mandrel with a shank 1 and 2 at one end for mounting in a drill chuck or the like and a threaded diameter 8 at its opposite end for the attachment of a cylindrical type hole saw (not shown). The two ends are connected by an axial shaft 16. A threaded section 14 is provided in the middle section of the axial shaft 16. An ejector mechanism is positioned around the threaded section 14 of shaft 16 consists of a grip ring 3 fitted with a thread follower 5 comprising a ball 503, a spring 502 and a set screw 501, a rod holder 4 slidable on the axial shaft 16, a retainer 12, two or more rods 6 and 7 firmly attached to rod holder 4 and slidably fitted through holes provided in flange 18 and a set of bearings 10 to reduce friction between the grip ring 3 and the rod holder 4. A circlip 17 on the shaft 16 limits travel of the grip ring 3 in the direction 600. The grip ring 3 in this embodiment is coated with a rubber, or the like, substance to provide a gripping surface. To put the invention into use, the mandrel shank 1 or 2 is mounted in a drill chuck or the like (not shown). The Grip ring 3 is grasped and slid in the direction 600 onto shaft diameter 16 until it strikes against the circlip 17. This motion causes the protruding ends of the ejector rods 6 and 7 to retract in the direction 600 into the flange 18 and clear of the threaded diameter 8. The pilot drill (not shown) is inserted into the pilot drill hole 9 and secured with the set screw 15. The cylindrical hole saw (not shown) of approximately one and one half inches in diameter or larger is rotated onto the threaded diameter 8 until it seats against the flange 18. The rotation is then reversed until the holes in the mounting end of the hole saw are aligned with the ejector rods 6 and 7. The grip ring 3 is then slid in the direction 500 until the spring loaded balls 5, located in holes provided around the periphery of the grip ring 3, enter the idler groove 13. This motion forces ejector rods 6 and 7 in the direction 500 to where they are protruding slightly through the holes in the hole saw mounting surface. At this point, the device is ready for cutting a hole in the workpiece.

With the drill motor in forward rotation, the hole is sawed in the workpiece in the usual manner, the saw is then withdrawn from the workpiece and the drill rotation is stopped. The cutout hole plug wil generally remain bound within the inner confines of the hole saw. The grip ring 3 is then grasped and the drill rotation started. Slight pressure is exerted on the grip ring 3 in the direction 500. The entire assembly rotates except the grip ring 3, spring loaded ball assemblies 5 and retainer ring 12. The spring loaded balls 503 engage the spiral thread 14 moving ejector rods 6 and 7 in the direction 500 until they contact the workpiece hole plug and force it in the direction 500 until it is free of the hole saw and pilot drill. The balls 503 then enter the idler groove 11 causing motion in the direction 500 to terminate. To retract the ejector rods, the drill motor rotation is reversed. The grip ring 3 is grasped and when the drill motor rotation is started, slight pressure on the grip ring 3 is applied in the direction 600. The balls 503, reengage the spiral thread 14 and the ejector rods 6 and 7 are retracted until the balls 503 enter the idler groove 13. The grip ring 3 is released and the drill motor rotation returned to the forward rotation position. This completes the cycle and the device is ready to cut the next hole.

Figure 3:
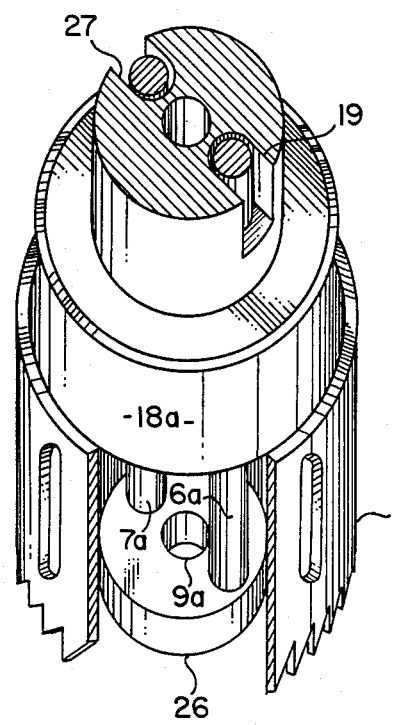
FIG. 3 is an enlarged partial cross section taken along the lines 3—3 in FIG. 2 with the hole saw added and the view rotated axially for clarity. The ejector ring and rods have been extended to the ejecting position.
Figure 2:
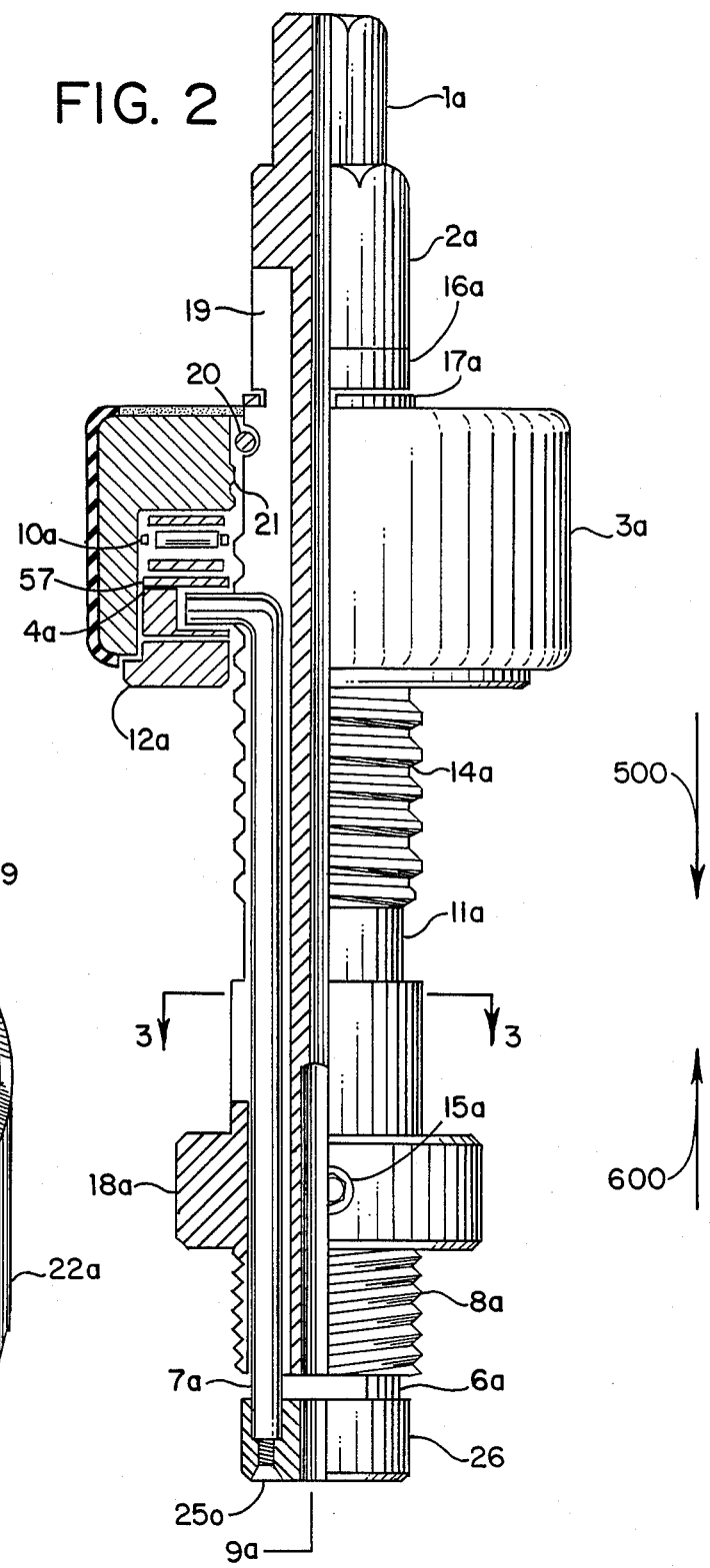
FIG. 2 is an enlarged schematic view of a second embodiment with a partial quarter section removed.

Reference is made to FIG. 2 and FIG. 3 cross sectional view of the present invention as one method of carrying the invention into practice. The embodiment described in FIG. 2 and FIG. 3 comprises a hollow mandrel with a shank or shanks 1a and 2a at one end for mounting in a drill chuck or the like, and a threaded diameter 8a at the opposite end for the attachment of a cylindrical type hole saw. The two ends are connected by an axial shaft 16a. A threaded section 14a is provided on the axial shaft 16a. An ejector mechanism is positioned around the threaded section 14a of the shaft 16a consisting of a grip ring 3a which has an internal thread 21 which mates with the thread 14a on the axial shaft 16a. A rod holder 4a, slidable on the axial shaft, is held within the cavity of the grip ring 3a by a retainer 12a. The rod holder 4a is fitted with one end of two or more L shaped rods 6a and 7a each of which are secured by retainer 57 and which slidably engage a groove 19 in the axial shaft 16a and slidably pass through a hole at the saw mounting end of the axial shaft 16a. The rods 6a and 7a are firmly affixed to an ejector ring 26 by means of screw 25a.

Friction between the grip ring 3a and the retainer 57 is reduced by bearing assembly 10a. A circlip 17a on the shaft 16a limits the travel of the ejector assembly in the direction 600 and a tension ring 20 holds the assembly in a rest position. The grip ring 3a is coated with a rubber, or the like, substance to provide a gripping surface.

The mandrel is mounted in a drill chuck (not shown) on either of shanks 1a or 2a to suit chuck size. The pilot drill (not shown) is inserted into the pilot drill hole 9a and secured with the set screw 15a. The cylindrical hole saw 22a, three quarters of an inch in diameter or larger, is turned onto threaded diameter 8a until it seats against the flange 18a. At this point the device is ready for cutting a hole in the workpiece.

With the drill motor in forward rotation, the hole is sawed in the workpiece in the usual manner and the saw is then withdrawn from the workpiece. The cutout hole plug will generally remain bound within the inner confines of the hole saw.

The grip ring 3a is then grasped and the drill rotation started. Slight pressure is exerted on the grip ring 3a in the direction 500 causing it to become free of the tension ring 20. The entire assembly rotates except the grip ring 3a and retainer ring 12a. The non rotating thread 21 engages the rotating thread 14a causing the ejector assembly to move in the direction 500 which forces ejector rods 6a and 7a and ejector ring 26 to also move in the direction 500 and force the workpiece hole plug from within the hole saw 22a and clear of the pilot drill. Motion in the direction 500 terminates when the non rotating thread 21 enters the idler groove 11a.

To retract the ejector ring 26, the drill motor rotation is reversed. The grip ring 3a is grasped. When the drill motor rotation is started, slight pressure is applied on the grip ring 3a in the direction 600. The non rotating thread 21 engages the rotating thread 14a and the ejector mechanism follows, in the direction 600, back to its original position where the tension ring 20 holds it. The grip ring 3a is then released and the drill motor rotation stopped. The drill motor rotation is returned to forward rotation. This completes the cycle and the device is ready to cut the next hole.

Figure 4:
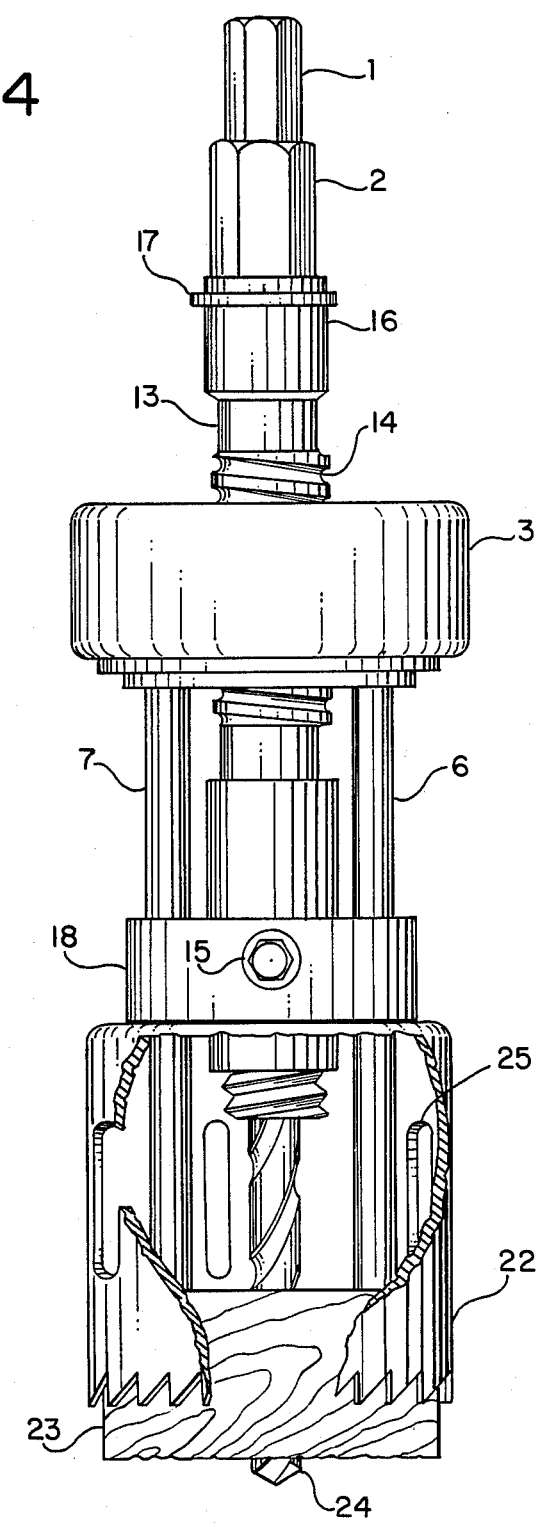
FIG. 4 is a schematic view of the embodiment shown in FIG. 1 with the hole saw and center drill in place and the cut out workpiece hole plug partially ejected from the hole saw.

FIG. 4 is a schematic view of the embodiment of the invention shown in FIG. 1 with a hole saw 22 and center drill 24 attached. The hole saw 22 has been partially cut away to reveal the cut out hole plug 23 and to better show how the ejector rods 6 and 7 contact the plug 23 to eject it from the confines of the hole saw 22.

Figure 5:
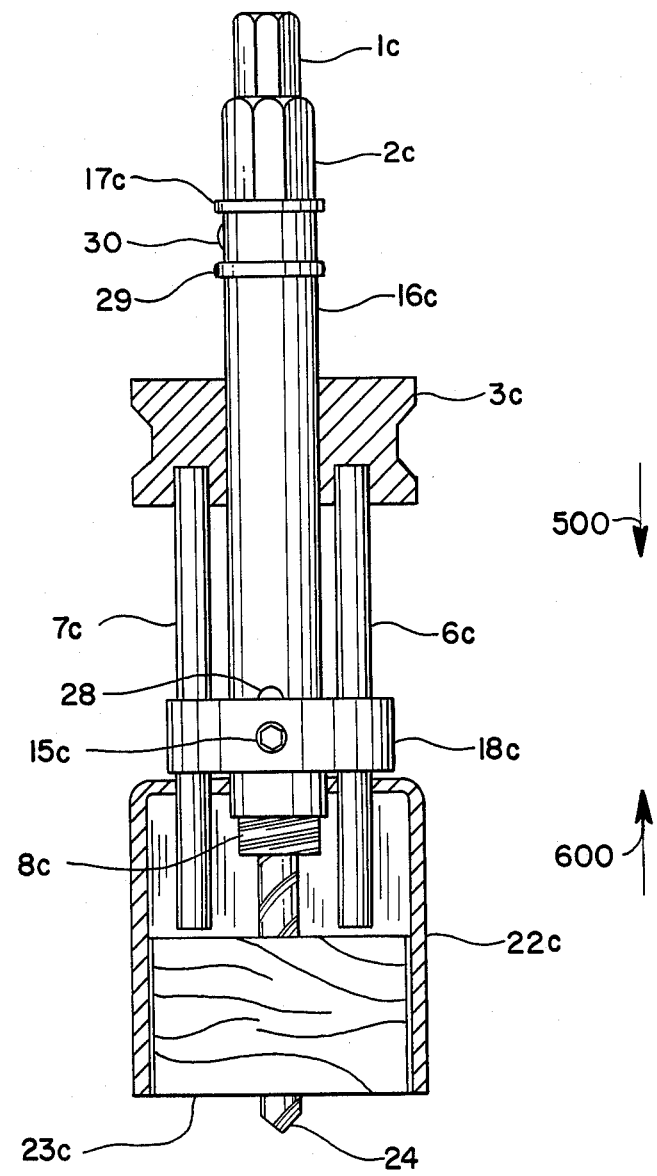
FIG. 5 is a schematic drawing of a manually operated version of the present invention, partially cross sectioned with a hold saw and pilot drill in place.

Reference is made to FIG. 5 schematic view partially cross sectioned of one of the preferred present embodiments of the invention with a standard cylindrical hole saw 22c and pilot drill 24 in place. This embodiment comprises a mandrel with a shank 1c or 2c at one end for mounting in a drill chuck (not shown) or the like and a threaded diameter 8c at the other end for mounting a cylindrical type hole saw 22c. A shaft 16c connects the two ends. A hole in the center of the shaft 16c at the saw mounting end allows for the mounting of a pilot drill 24 secured by a set screw 15c. The pilot drill hole extends through the length of the mandrel to provide for pilot drill removal should it break within the confines of the pilot drill hole.

The shaft 16c is encircled by a ring 3c slidable on the shaft 16c.

The ring 3c is firmly fitted with two or more rods 6c and 7c which extend slidably through holes in the flange 18c and extend through the holes provided in the mounting end of the hole saw 22c into the hole saw interior. The shaft 16c is fitted with a circlip 17c near the shank end to limit the travel of the ring 3c in the direction 600. The shaft is fitted with a tension ring 29 to hold the grip ring 3c in a rest position and a limiting stop 30 which may be overridden when there is need to install or remove the hole saw 22c from the mandrel. A means is provided to cushion the impact between the grip ring 3c and the flange 18c in the form of an energy absorbent bumper 28.

To put the invention into use, the mandrel is mounted in a drill chuck or the like on shank 1c or 2c. The limiter 30 is depressed and the grip ring 3c in slid in the direction 600 until it strikes against circlip 17c. The ends of the rods 6c and 7c are simultaneously withdrawn into the flange 18c and clear of the hole saw mounting surface. The hole saw 22c is rotated onto mounting thread 8c until it seats against flange 18c. The hole saw rotation is then reversed until the rods 6c and 7c are aligned with the holes in the mounting end of the hole saw 22c. The grip ring 3c is then slid in the direction 500 until it clears the limiter 30 but not beyond the tension ring 29. At this point the device is ready to cut a hole in the workpiece.

With the drill motor in forward rotation, the hole is sawed in the workpiece in the usual manner and the saw is then withdrawn from the workpiece and the drill rotation is stopped. The hole plug 23c will generally remain bound within the confines of the hole saw 22c. The grip ring 3c is firmly grasped and slid rapidly on the shaft 16c in the direction 500. This motion causes the push rods 6c and 7c to strike the cutout hole plug 23c and force it in the direction 500 from within the confines of the hole saw 22c and clear of the pilot drill 24. To withdraw the ejector rods 6c and 7c the grip ring 3c is slid on the shaft 16c in the direction 600 until it strikes against the limit stop 30. The device is now ready to cut the next hole.

FIG. 6 is a schematic view of another embodiment of the present invention in which a dual thread (one thread being cut over the other with the one being a left handed thread and the other being a right handed thread) and an engageable follower are utilized as a means of controlling the direction of travel of the ejector mechanism. Also, two types of ejector rods as similarly shown in FIG. 1 and FIG. 2 are combined into this one unit. The ejector mechanism described in FIG. 6 consists of a grip 3d, two or more followers 50 and 52, with spring 51, and pin 55, best seen in FIG. 7, a set of bearings 10d, a retainer 57, a rod holder 4d, a retainer 12d, a set of rods 6d and 7d and an additional set of rods 6e attached to ejector ring 26d. The rods 6d and 7d are threadedly removable from the rod holder 4d by means of the tool slot 53 in the protruding end of the rod 6d and 7d, when using hole saws under 1½ inches in diameter.

As described in the embodiments shown in the FIG. 1 through FIG. 5, the mandrel is mounted in a drill chuck or the like on either of shanks 1d or 2d. The pilot drill (not shown) is secured by a set screw (not shown).

The operation of the unit shown in FIG. 6 is the same as similarly described for FIG. 1 and FIG. 2 and does not need repeating except that the follower is engaged with threaded shaft 14d by depressing one of either followers 50 or 52, (of which the one is a right handed thread follower and the other is a left handed thread follower), into engagement with shaft thread 14d and the opposite one is engaged for reversing the direction of travel of the ejector mechanism. The spring clip 54 holds the ejector mechanism in the rest position.

FIG. 7 is an enlarged cross sectional view taken generally along the lines 7—7 in FIG. 6, with the shaft removed. This view depicts the thread follower 50 in the engaged position, and 52 in the disengaged position. When released, the spring 51 forces the follower 50 or 52 to move outward by pressing against pins 55, which are firmly fitted through follower 50 and 52, thereby disengaging the follower 50 and 52. The follower, 50 and 52 is guided by corridor 56 in the ring 3d.

FIG. 8 is a prespective view of an adaptor which enables hole saws with elongated mounting holes to be adapted to the present invention and FIG. 9 is an example of a typical hole saw to which it is fitted. The periphery of the contoured surface 71 is slidably fitted to the elongatad hole 80 with the surface 72 being slightly larger than surface 71 but with the same general contours. When the adaptor 71 is slidably fitted through the elongated hole 80 in hole saw 22d and the thread 73 turned onto the saw mounting thread 8d of the mandrel the hole saw is held in position against the mounting surface of flange 18d as shown best in FIG. 10.

FIG. 10 is a cross section taken along the lines 10—10 in FIG. 6 to better show the relation between the adaptor 70, the hole saw 22d, the thread 8d and the saw mounting surface of flange 18d. The rods 6d, 7d and 6c have been removed for clarity.

What is claimed is:

1. An improved hole saw mandrel adapted for use in a power drill or the like, the improvement comprising a means to eject a plug from within the confines of the whole saw; said mandrel comprising: an axial shaft with one portion adapted to be held in a drill chuck or the like for rotation on an axis coincident with the spindle of a drill or the like and a second portion adapted for the mounting of a cylindrical type of hole saw; a threaded section is provided on said axial shaft; an ejector mechanism slidable along said axial shaft; a thread following means provided to said ejector mechanism; provision for engaging the thread following means of the ejector mechanism with the threads of said threaded portion of the said axial shaft; two or more rods which extend from the main body of said ejector mechanism into the confines of the whole saw.

2. The hole saw mandrel as in claim 1 whereby a means is provided on the periphery of said ejector mechanism to provide a friction surface to prevent the rotation of a portion of said ejector mechanism when there is need.

3. The hole saw mandrel as in claim 1 whereby a means is provided to allow for rotation of a portion of the said ejector mechanism while allowing for another portion to remain rotationally stationary.

4. The hole saw mandrel as in claim 1 whereby a means is provided to reduce the friction between the rotational and stationary portions of said ejector mechanism by the use of a race of bearings or a friction reducing material such as teflon.

5. The hole saw mandrel as in claim 1 whereby said thread following means is provided by one or more holes in the ejecting mechanism running generally at right angle to the axial shaft and said holes containing a ball, a spring and a retaining screw.

6. The hole saw mandrel as in claim 1 whereby said thread following means is provided by threads cut into the body of the said stationary portion of said ejector mechanism.

7. An improved hole saw mandrel adapted for use in a power drill or the like, the improvement comprising a means to eject a plug from within the confines of the hole saw; said mandrel comprising: an axial shaft with one portion adapted to be held in a drill chuck or the like for rotation on an axis coincident with the spindle of a drill or the like and a second portion adapted for the mounting of a cylindrical type hole saw; a central threaded section is provided on said axial shaft, said threaded section comprising a dual thread of which the lead direction of one thread is in opposite direction to the lead direction of the other thread, an ejector mechanism slidable along said axial shaft, a first thread following means provided to said ejector mechanism, provision for engaging said first thread following means of said ejector mechanism with the threads of said central threaded portion of said axial shaft, a second thread following means with provision for engaging said second thread following means of said ejector mechanism with said central threaded portion of said axial shaft, said second thread following means providing movement of said ejector mechanisms along said central threaded portion of said axial shaft, in a direction opposite to the direction provided by said first thread following means of said ejector mehanism; said first and second thread following means, each comprising a threaded segment, slidably fitted within a corridor provided in said ejector mechanism, said corridor running generally at right angle to said threaded shaft; said first and second thread segments each being fitted with a spring and pin to cause said thread segment to slidably disengage from said central threaded portion of said axial shaft.

8. An adaptor for attaching a hole saw, of which the mounting contour is an elongated hole, to a hole saw mandrel which comprises a threaded shaft; said adaptor having a first elongated section slidably fitted to said elongated hole in said hole saw, and a second elongated section having a corresponding but larger contour than said first elongated section, the two said elongated sections being in tandem with each other; said adaptor having a central threaded hole which threadedly mates the said threaded shaft of said hole saw mandrel, the axis of said threaded hole being coincident with the axis of said first and second sections of said adaptor.

* * * * *